United States Patent Office 3,846,147
Patented Nov. 5, 1974

3,846,147
STABLE SUSPENSIONS OF CALCINED CLAYS
Michael Tapper, Sandersville, Ga., assignor to Burgess Pigment Company, Sandersville, Ga.
No Drawing. Filed June 5, 1972, Ser. No. 259,978
Int. Cl. C09c 1/42; C08h 17/06
U.S. Cl. 106—288 B           14 Claims

ABSTRACT OF THE DISCLOSURE

Stabilized aqueous suspensions of calcined clay pigment containing sufficient alkalizing agent to provide a pH in excess of 8 and to render the suspensions free from appreciable settling of pigment, and process for preparing same. Other features of the invention are shown in the specification.

This invention relates to Stabilized Suspensions of Calcined Clays, particularly to aqueous suspensions containing at least 40% by weight of calcined clay and containing sufficient alkalizing agent to impart to said suspension a pH of at least 8, the amount of said alkalizing agent further being sufficient to render said suspension free from appreciable settling of pigment therefrom.

BACKGROUND OF THE INVENTION

The pigment art has long recognized that there are significant and substantial differences between the hydrous clays of commerce and the relatively anhydrous or calcined clays sold in commerce. The principal market for hydrous clays is the paper making industry, whereas the principal market for calcined clays is in the manufacture of paints and coatings for wire and cables. Hydrous and calcined clays have distinctly different properties, which, inter alia, render them adaptable to differing end usages. Similarly, the physical properties of hydrous and calcined clays lead to differences in the forms in which they may be used and employed.

Traditionally, calcined clays are sold and used in dry form, packaged, e.g., in multi-wall paper containers. By contrast, a significant portion of hydrous clay is sold as an aqueous slurry or suspension. Such aqueous slurries of hydrous clays commonly contain on the order of 70% clay solids (by weight), and also contain approximately 5–6 lbs. per ton of a dispersant such as tetrasodium pyrophosphate or sodium hexametaphosphate (Calgon), together with other additives such as soda ash. Such aqueous suspensions of hydrous clays have, by reason of the incorporation of such phosphorous-containing dispersants, a pH approximating neutral, commonly in the range of 6.9–7. The hydrous clays themselves give a pH of approximately 3.5–4 in a 20% solids slurry.

While attempts have been made in the past to prepare slurries or suspensions of calcined clays, such attempts have been unsuccessful and unavailing, as the physical characteristics of calcined clays differ from those of hydrous clays. Aqueous suspensions of calcined clays have proven to be unstable, the pigment settling out and forming precipitates or sediments which are not readily redispersable, thus rendering them unsuitable as articles of commerce and potentially damaging to conduits, pumps and allied mechanical handling equipment.

THE PRESENT INVENTION

It is accordingly an object of this invention to provide suspensions of calcined clays which are stable, in the sense that aqueous suspension of such calcined clays are free from appreciable settling or separation of pigment. It is a further object of this invention to provide a process by which stabilized pigment suspensions of calcined clays may be prepared.

As used herein, the expression "calcined clay" refers to clay products, including those comprised principally of kaolin, which has been thermally treated to reduce or remove their bound water of hydration, and includes calcined clays having residual moisture contents of up to about 10% by weight.

According to this invention, a stabilized aqueous suspension of calcined clay is prepared by combining a calcined clay with water and sufficient alkalizing agent to provide a suspension which contains at least 40% by weight of calcined clay and contains sufficient alkalizing agent both to impart to the suspension a pH of at least 8 or greater and to render said suspension free from appreciable settling of pigment. The invention further embraces stabilized pigment suspensions comprising at least 40% by weight of calcined clay in an aqueous medium and further comprising sufficient alkalizing agent to impart to the suspension a pH of 8 or greater, the amount of said alkalizing agent in addition being sufficient to render said suspension free from appreciable settling of pigment. The process and composition of this invention additionally permit inclusion of various known ingredients such as dispersing agents, protective colloids and other known additives which are compatible with and promote the use of said suspensions in paint vehicles and other applications in which aqueous suspensions of calcined clays are usable or adaptable.

An advantage of this invention resides in the ability to provide stable suspensions of calcined clays having clay solids contents (by weight) in excess of 40%. A further distinct advantage of the process and product of this invention is the provision of such suspensions containing clay solids (by weight) in excess of 50%, and even ranging up to about 60% or more. In this connection it has been found that the effect of pH upon the stability of such aqueous suspensions of calcined clays is important. Particularly, it has been found that stable suspensions of calcined clays are rarely, if ever, achieved at a pH below about 8.0. An interrelationship appears to exist between clay solids content and pH, and in general, although not necessarily absolutely, the higher the clay solids content, the more important it is to employ a suitably high pH to provide a stable suspension. As more fully described hereinafter, a relatively high clay solids content in an aqueous suspension may be achieved at a pH of approximately 8.7. A further consideration, however, relates to the pumpability, i.e., viscosity, of the alkaline aqueous calcined clay suspension, and it has further been found in general, that higher clay solids suspensions have enhanced pumpability characteristics at higher pHs. Thus, it is a feature of this invention that enhanced pumpability (relatively lower viscosity) of calcined clay suspensions of relatively high solids contents of about 53% or greater is achieved by increasing the pH of said suspensions. Thus, it is possible, within the scope of this invention, to impart increased pumpability (lower viscosity) to stable suspensions of calcined clays either by slightly reducing the clay solids contents of such suspensions or, in the alternative, by slightly increasing the pH of said suspensions. Further discussion of these phenomena appears hereinafter in connection with the discussion of the data hereinafter set forth.

It is to be pointed out that prior art attempts to provide stable aqueous clay suspensions have principally concerned suspensions of hydrous clays. As noted previously, such suspensions contain about 5–6 lbs. per ton of dispersant; such suspensions having a nearly neutral pH of about 6.9–7. By contrast, the clay suspensions of this invention involve differing clays, viz, calcined clays in contradistinction to hydrous clays. Moreover, the nearly neutral pH range of the prior art is wholly unacceptable and inoperative for purposes of this invention, which requires an amount of alkalizing agent sufficient to impart to said suspensions a pH of at least 8 or more and, in addition, is sufficient to render said suspensions free from appreciable settling of pigment. Thus it will be appreciated that the calcined clays with which the present invention is concerned are different in properties and characteristics from the hydrous clays which have been purveyed in the prior art as aqueous suspensions, calcined clays having defied attempts over many years to find means for providing suitably stable aqueous suspensions thereof.

Nicholas Herschoff kiln, and which has a maximum residual moisture content of 0.3% as determined by ignition loss (*Optiwhite*, Burgess Pigment Co., Sandersville, Georgia.)

TABLES

| | Clay solids, percent | Alkalizing agent, lbs. per ton | | | | | HEC, lbs./ton | Clay slurry, pH | Viscosity, r.p.m. | Sedimentation | | Notes |
| | | TSPP | KTPP | N–K | N–L | Soda ash | | | | 24 hrs. | 72 hrs. | |
|---|---|---|---|---|---|---|---|---|---|---|---|---|
| Table I–A | 57 | | | | | | | 6.3 | 340 | 15 mm | | (a). |
| | 57 | 15 | | | | | | 8.7 | 280 | 7 mm | 25 mm | |
| | 57 | 20 | | | | | | 9.0 | 320 | 3 mm | 25 mm | |
| | 57 | 25 | | | | | | 9.1 | 270 | Trace | 9 mm | |
| | 57 | 30 | | | | | | 9.2 | 280 | None | 2 mm | (b). |
| | 57 | 35 | | | | | | 9.3 | 280 | do | None | |
| | 57 | 40 | | | | | | 9.3 | | | 5 mm | (c). |
| Table I–B | 57 | | 25 | | | | | 8.7 | 250 | 1 mm | 8 mm | |
| | 57 | | 30 | | | | | 9.1 | 240 | None | Trace | (d). |
| | 57 | | 35 | | | | | 9.1 | 240 | do | None | |
| | 55.4 | | 35 | | | | | 9.1 | 450 | Trace | do | (d). |
| Table I–C | 57 | | | 30 | | | | 9.3 | 230 | | None | (e). |
| | 58 | | | | 30 | | | 8.7 | 120 | | do | (f). |
| Table I–D | 57 | | | | | | 0.4 | 6.3 | 260 | 12 mm | | (g). |
| | 57 | | | | | | 2.0 | 6.0 | 190 | | | |
| Table I–E | 57 | 30 | | | | | 0.4 | 9.2 | 260 | | None | (h). |
| | 57 | | 30 | | | | 0.4 | 8.7 | 250 | | do | (h). |
| Table II–A | 55.6 | | | 30 | | | | 8.7 | 290 | None | | (f). |
| | 55.4 | | | | 30 | | | 9.2 | 400 | do | Trace | (e). |
| | 53.5 | | | 30 | | | | 8.7 | 880 | do | do | (f). |
| Table II–B | 55.4 | | | | | 20 | | 9.5 | 260 | | | |
| | 53.6 | | | | | 20 | | 9.4 | 410 | None | None | (i). |
| | 57 | | | | | 12 | | 9.0 | | 5 mm./2 hrs. | | |
| | 57 | | | | | 8 | | 8.5 | | 8 mm./2 hrs. | | | a Sediment was very hard and would not redisperse.
b 72-hr. sediment was a very soft gel, easily dispersed.
c Both sediments were dispersible gels.
d Trace sediment was a thin gel, easily dispersible.
e "N–K" stands for Nopcosnat K (Diamond Shamrock Chemical Co.), a 35% solids anionic polymer dispersant.
f "N–L" stands for Nopcosant L (Diamond Shamrock Chemical Co.), a 25% solids anionic polymer dispersant.
g Sediment was hard and non-redispersible.
h Slurry appeared gelled, but was flowable and drained from beaker.
i Made by dilution of preceding sample.

For further elucidation of the present invention, reference is made to the data contained in the appended tables. As shown therein, known additives commonly employed in prior art suspensions of hydrous clays have been shown to be ineffective to provide stable suspensions of calcined clays when used at levels comparable to those found to be effective for hydrous clays. Only upon using amounts of additives (which themselves constitute alkalizing agents) in vastly greater amounts, sufficient to provide strongly alkaline pHs far above those used or suggested in the prior art, does one obtain stable suspensions of calcined clays. Thus, the present invention departs markedly from the teachings of the prior art in a number of respects. Importantly, the present invention is in part based upon the discovery that an exceptionally high pH imparts stability and a viscosity promoting pumpability of the calcined clay suspension, neither of which observations is supported by the prior art. Further, the present invention employs amounts of alkalizing agents far in excess of those employed in the prior art. Further, and importantly, it has been found that relatively inexpensive alkalizing agents are readily adaptable for purposes of the present invention, thus rendering unnecessary the employment of the more expensive chemicals employed in the prior art as dispersing agents. Otherwise stated, such prior art dispersants may be adapted to use in the present invention provided they are used in quantities sufficient to provide the high pH necessitated in accordance with the present invention; however, such prior art materials may be replaced and obviated by inexpensive materials such as soda ash, which provide the high pH associated with this invention while not providing the dispersant effect upon which prior art techniques, relating to the differing hydrous clays of the prior art, depend.

In the appended tables, the clay used in each instance is a commercial non-delaminated clay which has been flash dehydrated in accordance with the teaching of U.S. Pat. 3,021,195 and thereafter calcined in a conventional Table I–A shows the comparative results of a control sample containing no additive with samples containing progressively larger increments of tetrasodium pyrophosphate (TSPP), a recognized dispersing agent. As the table reflects, increased amounts of that dispersant serve to raise the pH of the resultant slurry and, as the pH increased, the degree of sedimentation (observed after 24 hours and after 72 hours) markedly decreased; and as the pH was raised to levels significantly in excess of 9 the tendency to sedimentation ceased. Table I–A further shows that adding sufficient alkalizing agent to obtain a pH substantially in excess of 8 may not, in itself, provide a stable suspension, and that it is further necessary to add sufficient alkalizing agent to render the suspension free from appreciable settling of pigment (see also Table II–B). Viscosity determinations employed a Hercules high shear viscometer and reflect pumpability (the data report r.p.m. at a load of 18 dynes, lower r.p.m. reflecting higher viscosity).

Table I–B is similar to Table I–A, except that a different dispersant was used, viz., potassium tripolyphosphate (KTPP). Similar results were observed.

Table I–C reflects the results obtained with 30 lbs. per ton of Nopcosant K, a 35% solids anionic polymer dispersant, and Nopcosant L, a 25% solids anionic polymer dispersant. As shown in the second entry of Table I–C, a stable suspension containing 58% solids by weight of calcined clay was obtained employing sufficient additive to impart a pH of 8.7. The Hercules viscosity in that instance was 120 r.p.m. at 18 dynes, reflecting the desirability of either high pH or slightly lower clay solids content to obtain optimum pumpability characteristics.

Table I–D shows the effect of incorporation of a protective colloid, hydroxyethylcellulose, in calcined clay suspensions. In each case, the pH remained on the acid side and substantial sedimentation occurred, thus demonstrating that inclusion of a protective colloid in the amounts reflected was incapable of providing a stable calcined clay suspension. As shown in Table I–E, however, inclusion of the protective colloid, hydroxyethyl cellulose, in combination with amounts of additive sufficient to impart a pH substantially in excess of 8 had no adverse effect and did not detract from the results achieved by employment of the relatively high pH with which this invention is concerned, despite a somewhat lower pH than that obtained with the same amount of KTPP alone. These data thus show the compatibility of the compositions of this invention with commonly used paint additives.

In Table II, calcined clay solids were determined on an oven-dried basis (except for the last two entries in Table II–B). In Table II–A, identical amounts of anionic polymer dispersant were used, the proportion of clay solids varying in each of the three entries. It is seen that for roughly equivalent amounts of clay solids (first two entries in Table) that the higher pH gave lesser viscosity (higher r.p.m. by the Hercules test) and hence enhanced pumpability. The third entry in Table II–A shows that a relatively small decrease in solids content gave a marked decrease in the table. Hence, referring to the first and third entries in Table II–A, a small decrease in solids content at the same pH resulted in a suspension of considerably lesser viscosity having substantially enhanced pumpability characteristics.

In Table II–B common soda ash was employed as the only additive to the aqueous calcined clay suspension. In amount sufficient to provide a pH substantially in excess of 9, no appreciable settling of pigment from suspension was observed. It is further to be noted that, comparing the first two entries of the Table, a very small decrease in pigment solids at essentially the same pH markedly decreased the viscosity (increased r.p.m.) and hence rendered the suspension significantly more pumpable.

From the foregoing it is seen that, while employment of prior art dispersant agents in amounts greatly in excess of those in the prior art rendered calcined clay suspensions essentially stable, employment of common and inexpensive alkalizing agents such as ordinary soda ash effected the same consequence. Alkali and alkaline earth hydroxide and salts, such as potash, lye and other such cheap materials, may also be used. Thus, importantly, it has been discovered that the stability of aqueous suspensions of calcined clay are to a substantial and significant extent pH-dependent and that stable suspensions can be obtained inexpensively and effectively by employment of common, cheap alkalizing agents to the exclusion of the more expensive long-chain polymeric expedients employed in connection with the non-analogous hydrous clays of the prior art. The present invention, however, contemplates the inclusion of known clay suspension additives in relatively minor amounts for known purposes, such additives including dispersants such as KTPP and TSPP, as well as other anionic polymer dispersions and thickening agents such as hydroxyethylcellulose and like protective colloids. While unnecessary to practice of the present invention, the required alkalinity of the stable pigment suspensions with which this invention is concerned may be provided, either entirely or in part, by such known dispersants, which are used in amounts greatly in excess of those employed in the prior art relating to hydrous clay suspensions.

From the data presented it will be observed that by employment of sufficient alkalizing agent to provide a pH in excess of 8, stable suspensions of calcined clay free from appreciable settling of pigment are provided. It is further seen that viscosity, and hence pumpability of such suspensions, may be regulated within the ambit of the present invention, by suitable adjustment of clay solids content or, particularly at higher pigment contents, by suitable increase of pH, preferably to a pH in excess of 9. It is to be appreciated that, as noted hereinabove, such calcined clay pigments may have moisture contents up to 10%; and it is further to be appreciated that other ingredients either common or uncommon to clay suspensions may be included within the spirit of this invention including, illustratively, up to 10% or more of hydrous clay pigment in combination with the principal calcined clay ingredient of the suspensions with which the present invention is concerned.

While the art will recognize many uses for the compositions of this invention, they are particularly adapted for use in the manufacture of water-based paints such as latex paints. In manufacture of such paints, calcined clay pigment is combined in aqueous medium with a polymeric latex dispersion and other ingredients (such as titanium dioxide). Provision of the stable pigment suspension of the present invention thus facilitates and simplifies the paint manufacturing operation and obviates the need for the paint manufacturer to place the clay pigment in suspension.

What is claimed is:

1. A calcined clay pigment suspension comprising at least 40% by weight of calcined clay in an aqueous medium and further comprising sufficient alkalizing agent both to impart a pH of at least 8 to said suspension and to stabilize said suspension and render it free of appreciable settling of pigment, said alkalizing agent further providing said suspension with a pH sufficiently high to render such suspension pumpable.

2. A suspension as defined by claim 1 containing at least 50% by weight of calcined clay pigment.

3. A suspension as defined in claim 2 having a pH in excess of 9.0.

4. A suspension as defined in claim 1 wherein said alkalizing agent comprises at least in part an alkaline anionic dispersant.

5. A suspension as defined in claim 1 wherein said alkalizing agent comprises at least in part an alkaline anionic polymeric dispersant.

6. A suspension as defined in claim 1 wherein said alkalizing agent comprises at least in part soda ash or lye.

7. A suspension as defined in claim 1 wherein said alkalizing agent comprises at least in part an alkali or alkaline earth hydroxide or a salt thereof.

8. A process for preparing a calcined clay pigment suspension comprising combining sufficient alkalizing agent, calcined clay and water to provide a suspension containing at least 40% by weight calcined clay and having a pH of at least 8, the amount of said alkalizing agent further being sufficient to stabilize said suspension and render it free of appreciable settling of pigment, sufficient alkalizing agent being employed further to provide a pH sufficiently high to render such suspension pumpable.

9. A process as defined in claim 8 wherein sufficient calcined clay is employed to provide a suspension containing at least 50% by weight of calcined clay pigment.

10. A process as defined in claim 8 wherein sufficient alkalizing agent is employed to provide a suspension having a pH in excess of 9.0.

11. A process as defined in claim 8 wherein said alkalizing agent comprises at least in part an alkaline anionic dispersant.

12. A process as defined in claim 8 wherein said alkalizing agent comprises at least in part an alkaline anionic polymeric dispersant.

13. A process as defined in claim 8 wherein said alkalizing agent comprises at least in part soda ash or lye.

14. A process as defined in claim 8 wherein said alkalizing agent comprises at least in part an alkali or alkaline earth hydroxide or a salt thereof.

References Cited
UNITED STATES PATENTS

| | | | |
|---|---|---|---|
| 3,014,836 | 12/1961 | Proctor | 106—72 |
| 3,582,378 | 6/1971 | Miller | 106—308 Q |
| 2,274,467 | 7/1941 | Barker et al. | 106—72 |

DELBERT E. GANTZ, Primary Examiner

J. V. HOWARD, Assistant Examiner

U.S. Cl. X.R.

106—72, 308 B, 308 Q

UNITED STATES PATENT OFFICE
CERTIFICATE OF CORRECTION

PATENT NO. : 3,846,147
DATED : November 5, 1974
INVENTOR(S) : Michael Tapper

It is certified that error appears in the above-identified patent and that said Letters Patent are hereby corrected as shown below:

Col. 4, line 61.  "high" should be --higher--

Col. 5, line 15.  After "decrease" insert --in viscosity (higher rpm) at a pH equal to that of the first entry--

In the References Cited, the Barker et al. reference should be changed from "2,274,467" to --2,247,467--

Signed and Sealed this fourteenth Day of October 1975

[SEAL]

Attest:

RUTH C. MASON
Attesting Officer

C. MARSHALL DANN
Commissioner of Patents and Trademarks